United States Patent
Ryota et al.

(10) Patent No.: US 12,447,593 B2
(45) Date of Patent: Oct. 21, 2025

(54) NUT RUNNER CONTROL SYSTEM HAS A TIGHTENER THAT IS PROVIDED WITH MARKER AND CAMERA REMOTELY IMAGES THE MARKER TO DETECT POSITION OF THE TIGHTENER

(71) Applicant: SANYO MACHINE WORKS, LTD., Aichi (JP)

(72) Inventors: Hisashi Ryota, Aichi (JP); Shigenori Onishi, Aichi (JP)

(73) Assignee: SANYO MACHINE WORKS, LTD., Aichi (JP)

( * ) Notice: Subject to any disclaimer, the term of this patent is extended or adjusted under 35 U.S.C. 154(b) by 339 days.

(21) Appl. No.: 18/020,759

(22) PCT Filed: Oct. 13, 2020

(86) PCT No.: PCT/JP2020/038665
§ 371 (c)(1),
(2) Date: Feb. 10, 2023

(87) PCT Pub. No.: WO2022/079810
PCT Pub. Date: Apr. 21, 2022

(65) Prior Publication Data
US 2023/0302613 A1 Sep. 28, 2023

(51) Int. Cl.
*B25B 23/147* (2006.01)
*G06T 7/73* (2017.01)
*F16D 3/38* (2006.01)

(52) U.S. Cl.
CPC .............. *B25B 23/147* (2013.01); *G06T 7/74* (2017.01); *F16D 3/38* (2013.01); *G06T 2207/30204* (2013.01)

(58) Field of Classification Search
None
See application file for complete search history.

(56) References Cited

U.S. PATENT DOCUMENTS 11,014,222 B2 * 5/2021 Hohmann ............. B25B 21/008
2014/0111639 A1 4/2014 Tanaka et al.
(Continued)

FOREIGN PATENT DOCUMENTS

JP 08-226299 9/1996
JP 2002-346857 12/2002
(Continued)

OTHER PUBLICATIONS

International Search Report issued Jan. 12, 2021, in International (PCT) Application No. PCT/JP2020/038665, with English translation.
(Continued)

*Primary Examiner* — Haris Sabah
(74) *Attorney, Agent, or Firm* — Wenderoth, Lind & Ponack, L.L.P.

(57) ABSTRACT

A control system 100 for a tightener (nut runner 10) of the present invention includes a marker M provided on the tightener, a camera 31 (32) that remotely images the marker M and detects a position of the tightener, and a controller that stores a target tightening torque value of a plurality of tightened members (bolts B) together with position information of the tightened members, and sets a tightening torque value of the tightener for each of the tightened members to be tightened by the tightener on the basis of the position of the tightener detected by the camera.

4 Claims, 5 Drawing Sheets

(56) References Cited

U.S. PATENT DOCUMENTS

| | | | |
|---|---|---|---|
| 2015/0018999 A1 | 1/2015 | Lee et al. | |
| 2016/0207180 A1* | 7/2016 | Hohmann | B25B 23/0078 |
| 2021/0146513 A1* | 5/2021 | Banzola | G06K 7/1413 |
| 2023/0415311 A1* | 12/2023 | Tucker | B25B 23/0028 |

FOREIGN PATENT DOCUMENTS

| | | | |
|---|---|---|---|
| JP | 2013-132736 | | 7/2013 |
| JP | WO2013111387 | * | 8/2013 |
| JP | 2015-016854 | | 1/2015 |
| JP | 5806184 | | 11/2015 |
| JP | 6083747 | | 2/2017 |
| JP | 2018-202521 | | 12/2018 |
| JP | 2019-126874 | | 8/2019 |

OTHER PUBLICATIONS

International Preliminary Report on Patentability and Written Opinion of the International Searching Authority issued Apr. 13, 2023 in International (PCT) Application No. PCT/JP2020/038665.

* cited by examiner

Fig. 5

| TIGHTENING LOCATION (ORDER) | POSITION COORDINATES OF TIGHTENING LOCATION | | | TIGHTENING TORQUE | TIGHTENING COMPLETION TIME | DETERMINATION RESULT |
|---|---|---|---|---|---|---|
| | X | Y | Z | | | |
| 1 | $x_1$ | $y_1$ | $z_1$ | $T_1$ | 10:10:00 | OK |
| 2 | $x_2$ | $y_2$ | $z_2$ | $T_2$ | 10:10:10 | OK |
| 3 | $x_3$ | $y_3$ | $z_3$ | $T_3$ | 10:10:20 | OK |
| 4 | $x_4$ | $y_4$ | $z_4$ | $T_4$ | 10:10:30 | OK |
| 5 | $x_5$ | $y_5$ | $z_5$ | $T_5$ | 10:10:40 | OK |
| ... | ... | ... | ... | ... | ... | ... |
| 13 | $x_{13}$ | $y_{13}$ | $z_{13}$ | $T_{13}$ | 10:12:00 | OK |
| 14 | $x_{14}$ | $y_{14}$ | $z_{14}$ | $T_{14}$ | 10:12:10 | OK |
| 15 | $x_{15}$ | $y_{15}$ | $z_{15}$ | $T_{15}$ | 10:12:20 | OK |
| 16 | $x_{16}$ | $y_{16}$ | $z_{16}$ | $T_{16}$ | 10:12:30 | OK |

NUT RUNNER CONTROL SYSTEM HAS A TIGHTENER THAT IS PROVIDED WITH MARKER AND CAMERA REMOTELY IMAGES THE MARKER TO DETECT POSITION OF THE TIGHTENER

TECHNICAL FIELD

The present invention relates to a control system for a nut runner, specifically, to a control system for a nut runner, in which a marker attached to the nut runner is imaged by a camera, a three-dimensional position of the nut runner is detected from the obtained image, the three-dimensional position is collated with position information of tightened members such as a nut or a bolt to be tightened by the nut runner by using a detection result, and a tightening torque of the nut runner is set for each of the tightened members.

BACKGROUND ART

A nut runner is used to tighten a bolt into a screw hole of a workpiece and tighten a nut to a stud bolt fixed to the workpiece. During tightening, if a tightening torque is out of a specified range, a tightening failure occurs. Instead of the tightening torque, when a tightening angle or a tightening time is out of a specified range, it may be also regarded that a tightening failure occurs.

Conventionally, as a screw tightening device in which an operator grips a nut runner attached to an arm movable in horizontal and vertical directions, operates the nut runner to a desired position, and tightens a screw, a screw tightening device disclosed in Patent Literature 1 (JP 2002-346857 A) is known. The screw tightening device includes a position detector that detects position information of the arm.

A control unit of the screw tightening device is configured to collate and determine current position information of the arm and a preset screw tightening point, and display a result of the determination. In the control unit, an order of tightening a plurality of screw tightening points and a target tightening torque can also be set to reduce operation errors.

CITATIONS LIST

Patent Literature

Patent Literature 1: JP 2002-346857 A
Patent Literature 2: JP H08-226299 A
Patent Literature 3: JP 5806184 B2
Patent Literature 4: JP 6083747 B2

SUMMARY OF INVENTION

Technical Problems

In the device of Patent Literature 1, since operation is performed in a state where the nut runner is supported by the arm, it is possible to cope with a tightened member having a large tightening reaction force, but a movement range of the nut runner is limited by the arm, or an orientation (tightening direction) of the nut runner is practically restricted to a vertical or horizontal orientation. For this reason, there is a problem that a degree of freedom of handling of the nut runner and a tightening location are restricted. On the other hand, a so-called hand nut runner that operates by being held by hand can be freely handled, but the position of the nut runner cannot be detected.

At present, a plurality of nut runners is prepared for tightening torques of 3 Nm, 4 Nm, and the like, the nut runner corresponding to a required tightening torque is selected depending on the tightening location, and tightening is performed. Therefore, there has been always a possibility that the nut runner is erroneously selected, and it has been difficult to manage a tightening completion torque value. In addition, there is a case where a tightening operation area is divided in order to prevent erroneous selection of the nut runner, but in that case, there is a problem that the operation area is enlarged. Although it is not impossible to detect the position of the nut runner by a three-dimensional measuring device or the like, the equipment would become large and the cost would increase.

Therefore, an object of the present invention is to provide a control system for a nut runner, capable of detecting a position of the nut runner by a simple method and easily setting a target tightening torque value for a tightened member.

Solutions to Problems

To solve the above problems, a control system for a tightener of the present invention controls driving of the tightener when a tightened member such as a nut or a bolt is rotated and tightened by the tightener held by an operator, the control system including a marker provided on the tightener, a camera that remotely images the marker and detects a position of the tightener, and a controller that stores a target tightening torque value of a plurality of the tightened members together with position information of the tightened members, and sets a tightening torque value of the tightener for each of the tightened members to be tightened by the tightener on the basis of the position of the tightener detected by the camera.

Advantageous Effects of Invention

The control system of the present invention can easily set the target tightening torque value of the tightener for the tightened member.

BRIEF DESCRIPTION OF DRAWINGS

FIG. 5 is a diagram of a setting table of position coordinates, a tightening torque, and the like of a bolt tightening location on a workpiece.

DESCRIPTION OF EMBODIMENT

Hereinafter, a control system for a nut runner according to an embodiment of the present invention will be described with reference to the drawings.

(Outline of Control System)

Figure 1:
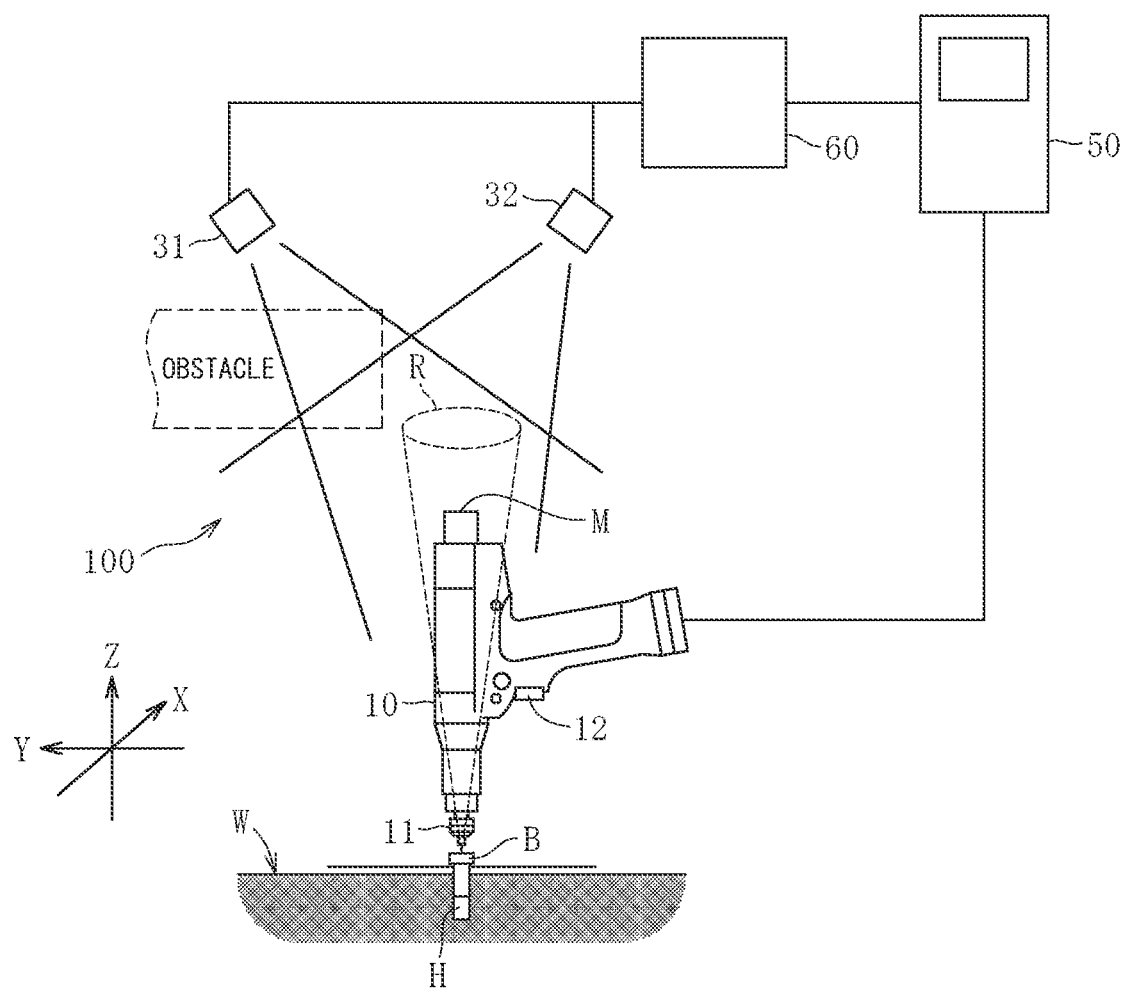
FIG. 1 is a schematic diagram of a control system for a nut runner according to an embodiment of the present invention.

A control system 100 in FIG. 1 includes a nut runner 10, two cameras 31 and 32, a controller 50, and a vision controller 60. In FIG. 1, there are two cameras 31 and 32 in consideration of a case where a field of view of one of the cameras may be blocked by an obstacle. Basically, one camera is sufficient, and for example, a three-dimensional position and orientation (inclination) of the nut runner 10 (a marker M) can be detected only by the camera 31 on the left side.

The nut runner 10 and the camera 31 (32) are connected to the controller 50 in a wired manner. The three-dimensional position of the nut runner 10 is detected by processing an image obtained by the camera 31 (32) by a vision controller 60, and a motor of the nut runner 10 is driven and controlled by a controller 50 on the basis of the three-dimensional position.

The nut runner 10 and the camera 31 (32) can be connected to the controller 50 in a wireless manner. In the wireless manner, the camera 31 (32) can be moved in a wide range, and a plurality of nut runners 10 can be easily and centrally controlled by one controller 50.

Depending on an object to be tightened (bolt, nut, or screw), the nut runner 10 has a rotating distal end that is a socket or a bit. In the present embodiment, a pistol type nut runner 10 which is a kind of hand nut runner is used.

The nut runner 10 has a socket 11 at the distal end. The socket 11 of ¼ inches or ⅜ inches is generally used. When the distal end is a bit, a bit having a 6.35 mm hexagonal or half-moon notch is used. A bolt B is shown in FIG. 1 as an object to be tightened. The bolt B is screwed into an internal screw hole H of a workpiece W by placing the socket 11 on a head of the bolt B and driving the nut runner 10.

The socket 11 is a button type that rotates by pulling a trigger 12. A push start type can also be used instead of a button type. With the push start type, the nut runner 10 automatically starts to rotate by pressing a tip of the bit against a tightened portion.

(Marker)

Figure 2:
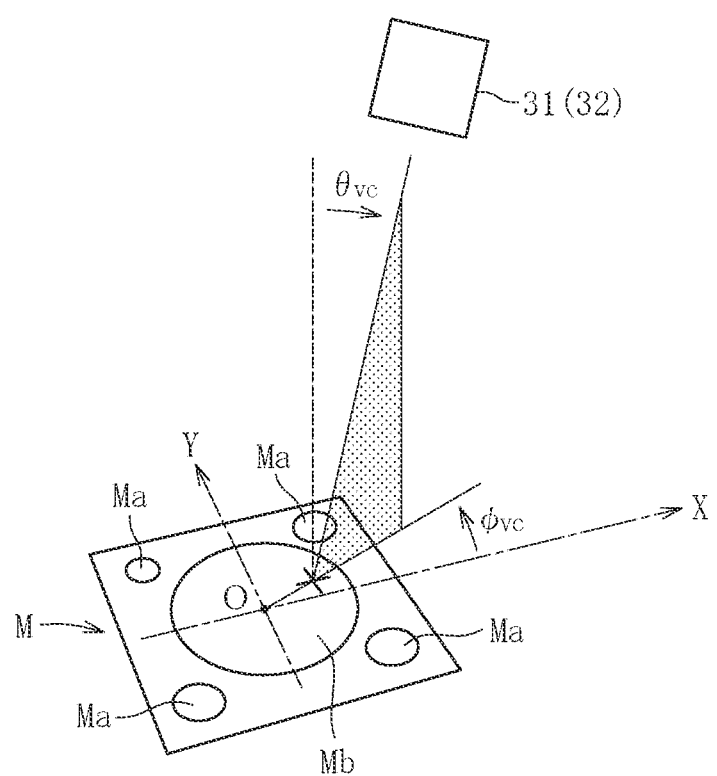
FIG. 2 is a schematic perspective view of a marker used in the control system of a nut runner.

The known marker M as shown in FIG. 2 is provided on a rear end flat portion of the nut runner 10. The position and orientation of the nut runner 10 can be detected from an image of the marker M captured by the camera 31 (32).

Details of the marker M are shown in, for example, FIG. 2 of Patent Literature 4 (JP 6083747 B2). According to Patent Literature 4, the marker M has a rectangular shape, and includes a reference points Ma formed at the four corners and a lens area Mb formed at the center.

The lens area Mb includes a microlens array in which a large number of microlenses are arranged in a matrix, and a mark array in which a plurality of marks is arranged similarly to a pitch between a plurality of lenses constituting the microlens array. The microlens array and the mark array are configured to generate a moire (interference fringe) pattern in an image captured by the camera 31 (32).

The moire pattern changes depending on an angle at which the marker M is viewed. Therefore, by analyzing the moire pattern by image processing, angle information ($\theta$vc, $\varphi$vc) of a line of sight of the camera 31 (32) with respect to the marker M can be extracted. As a result, even with one marker M, it is possible to measure a position (x, y, z) and orientation (roll, pitch, yaw) in six degrees of freedom.

The plurality of marks can be configured by, for example, a matrix-like array of "+" symbols. The "+" symbol is an example and is not limited thereto. For example, a circular mark or a dot mark may be adopted instead of the + symbol.

In the lens area Mb according to the present embodiment, a lens with a + symbol printed exactly at the center of (directly below) the lens is a center lens. As a distance from the center lens increases, a phase difference between the microlens array and the + symbol increases.

From the position and orientation of the marker M, the controller 50 determines whether the nut runner 10 is in a tightenable orientation range R in FIG. 1. The trigger 12 of the nut runner 10 is actuatable only when the nut runner 10 is in the tightenable orientation range R. When the nut runner 10 is out of the tightenable orientation range R, the trigger 12 is in a non-actuation state in which an operator U cannot pull the trigger 12 of the nut runner 10 or the nut runner 10 does not react to the trigger 12 being pulled.

A so-called "motion capture system" capable of measuring a three-dimensional image from a single marker, such as "6D-MARKER" (registered trademark) of PHOTRON LIMITED, is commercially available from a plurality of companies. Such a system can be used instead of the marker M.

(Examples of Use of Control System)

Figure 3:
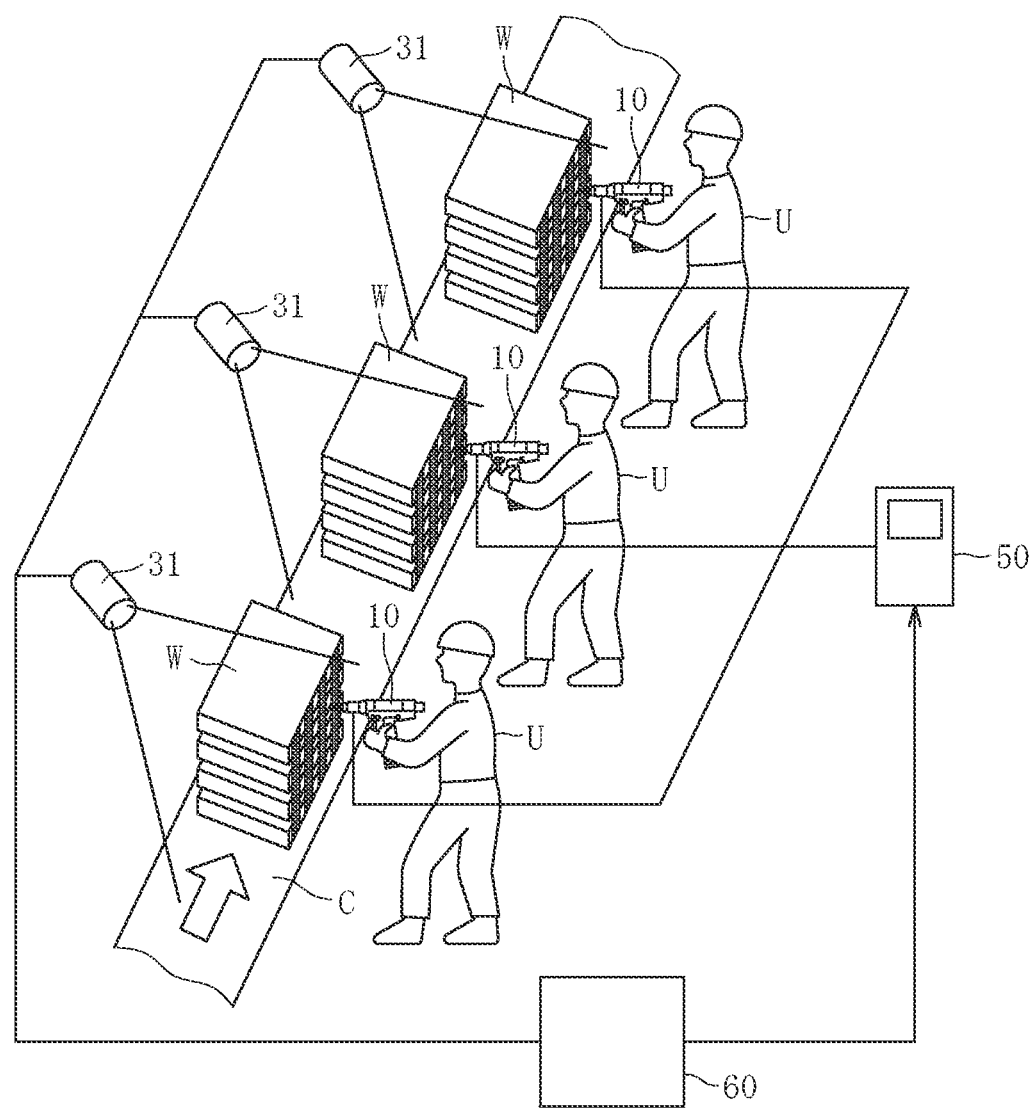
FIG. 3 is a perspective view illustrating a state in which a workpiece is bolted by using the control system for a nut runner.
Figure 4:
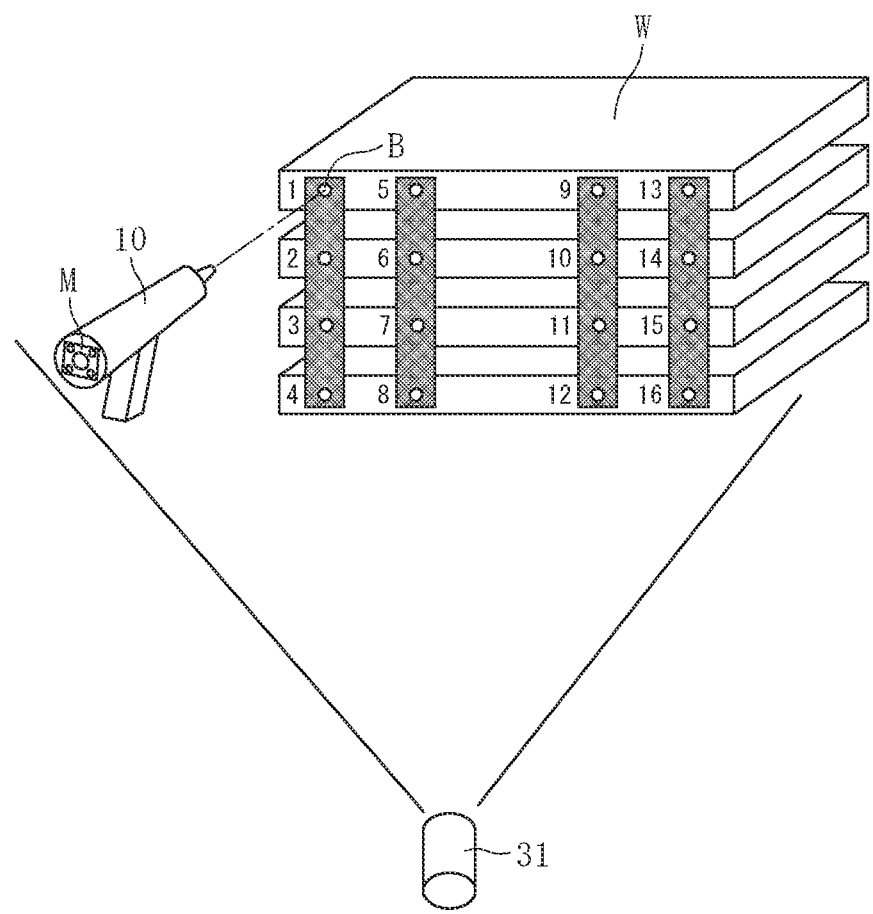
FIG. 4 is a perspective view of a workpiece bolted by a nut runner.

FIGS. 3 to 5 show examples of use of the control system 100 of a tightener according to the present invention. An operation of sequentially tightening bolts 1 to 16 as shown in FIG. 4 is performed on the workpiece Was an object to tighten shown in FIG. 3. The workpiece W is conveyed in an arrow direction by a belt conveyor C. When the belt conveyor C is temporarily stopped, each operator U sequentially tightens the bolts 1 to 16 with the nut runner 10.

The position and orientation of the nut runner 10 are detected by the vision controller 60 on the basis of image information obtained by imaging the marker M attached to the nut runner 10 by the camera 31. Here, as shown in a setting table of FIG. 5, an order of tightening, position coordinates x, y, and z, and a tightening torque T of each bolts 1 to 16 at a temporary stop position of the belt conveyor C are stored in advance in the controller 50. The table in FIG. 5 can be displayed on a monitor of a personal computer connected to the controller 50.

When the operator U holds the nut runner 10 horizontally and places the socket 11 on the head of the bolt 1 to be tightened first, the vision controller 60 detects the three-dimensional position (x, y, z) and a horizontal orientation of the nut runner 10 from the image information of the marker M imaged by the camera 31. When the controller 50 determines that the nut runner 10 is in a state (position and orientation) of capable of tightening the bolt 1, the trigger 12 of the nut runner 10 is in an actuation state, and the operator U can drive the nut runner 10 by pulling the trigger 12.

Even if the position (x, y, z) of the nut runner 10 is correct, if the orientation of the nut runner 10, that is, an axis of the socket 11 is inclined from an axis of the bolt 1, screw biting occurs or tightening failure occurs. In the present embodiment, unless both the position and orientation of the nut runner 10 are resulted in OK, the trigger 12 is in a non-actuation state in which an operator U cannot pull the trigger 12 of the nut runner 10 or the nut runner 10 does not react to the trigger 12 being pulled.

When the tightening of the first bolt 1 is completed, the tightening torque T of the first bolt B is detected by a torque sensor incorporated in the nut runner 10. When the torque T falls within a range of a specified torque value, a determination result of "OK" and a tightening completion time are recorded in the controller 50.

Thereafter, the second and subsequent bolts are similarly tightened by the nut runner 10, and the determination result of "OK" and the tightening completion time are successively recorded in the controller 50. In this manner, the operator can reliably complete the tightening at a specified torque only by placing the socket 11 of the nut runner 10 on the head of each bolt B and pulling the trigger 12. The determination result of the tightening torque "OK" and the tightening completion time are also automatically recorded in the controller 50.

Not only the tightening torque T but also a tightening angle and a tightening time can be included as information to be recorded. By recording the information together with the tightening torque T, traceability of a tightening operation can be enhanced.

The tightening angle is a rotation angle after the bolt is seated on a bearing surface of the workpiece. In order to detect the tightening angle, an angle sensor can be incorporated in the nut runner 10. The tightening time is a time until the tightening is completed after the bolt is seated on the bearing surface of the workpiece. A seating timing of the bolt can be detected at a rise of the torque of the torque sensor. A time until the bolt is seated on the bearing surface of the workpiece after the trigger 12 is pulled is referred to as a "seating time".

When the tightening torque T is out of a range of the specified torque value, the controller 50 records a determination result of "NG" and notifies the operator of the determination result of "NG" (tightening error). The notification is performed by turning on a warning lamp disposed near the operator with a lighting signal from the controller 50. It is needless to say that other notification forms such as a warning sound may be used together with or instead of the warning light.

Although the embodiment of the present invention has been described, the present invention is not limited to the embodiment, and permits various modifications. For example, in the embodiment, the control system for tightening the bolt B by the nut runner 10 has been described, but the control system is applicable to not only the bolt B or the nut runner 10 but also any tightener capable of tightening screws.

In the embodiment, the tightening error is notified by turning on the warning light with the lighting signal from the controller 50. However, a large error display device may be disposed so that the operator U can easily see the tightening error, the controller 50 may be connected to the error display device, and a tightening location to be corrected may be displayed in a large size for the operator U.

Furthermore, a mark that can be imaged by the camera 31 may be attached to the head of the bolt B, which is a location to be tightened. This configuration can improve accuracy of the position coordinates x, y, and z of the head of the bolt B stored in the controller 50.

REFERENCE SIGNS LIST

10: Nut runner
11: Socket
12: Trigger
31, 32: Camera
50: Controller
60: Vision controller
100: Control system
B: Bolt
C: Belt conveyor
M: Marker
Ma: Reference point
Mb: Lens area
R: Tightenable orientation range
U: Operator
W: Workpiece

The invention claimed is:

1. A control system for a tightener, the control system configured to control driving of the tightener when a tightened member is rotated and tightened by the tightener held by an operator, the control system comprising:
    a marker provided on the tightener;
    a camera that remotely images the marker and detects a position of the tightener; and
    a controller that stores a target tightening torque values of a plurality of tightened members together with position information of the tightened members, stores an order of tightening the plurality of tightened members to be tightened by the tightener together with the position information of the tightened members, sets a tightening torque value of the tightener for each of the tightened members to be tightened by the tightener based on the position of the tightener detected by the camera, and enables the driving of the tightener only when the tightener is moved to one of the tightened members in accordance with the order of tightening with the tightener.

2. The control system according to claim 1, wherein
    the camera detects an orientation of the tightener together with the position of the tightener, and
    the controller stores information of an axial direction of the tightened members together with the position information of the tightened members, collates the information of the axial direction with the orientation of the tightener detected by the camera, and enables the driving of the tightener only when an axial direction of the tightener coincides with the axial direction of the one of the tightened members.

3. The control system according to claim 1, wherein
    the tightener includes a torque detector that detects a tightening completion torque value of the one of the tightened members that has completed to be tightened, and
    the controller records a tightening completion torque value detected by the torque detector for each of the tightened members together with the target tightening torque value.

4. The control system according to claim 3, wherein the controller performs determination of whether the tightening completion torque value is within a specified range of the target tightening torque value, and when the tightening completion torque value is outside the specified range, the controller notifies an operator of a result of the determination.

* * * * *